US007159791B2

(12) United States Patent
Lambden

(10) Patent No.: US 7,159,791 B2
(45) Date of Patent: Jan. 9, 2007

(54) METHOD OF AND APPARATUS FOR MOUNTING WATER CUTTING NOZZLES

(75) Inventor: Richard L. Lambden, Colleyville, TX (US)

(73) Assignee: Perfect Score Technologies, L.L.C., Red Oak, TX (US)

( * ) Notice: Subject to any disclaimer, the term of this patent is extended or adjusted under 35 U.S.C. 154(b) by 272 days.

(21) Appl. No.: 10/831,842

(22) Filed: Apr. 26, 2004

(65) Prior Publication Data

US 2005/0236495 A1 Oct. 27, 2005

(51) Int. Cl.
*A01G 25/09* (2006.01)

(52) U.S. Cl. .......................................... 239/1; 239/589

(58) Field of Classification Search .................... 239/1, 239/589, 590, 596, 600

See application file for complete search history.

(56) References Cited

U.S. PATENT DOCUMENTS 6,779,746 B1 * 8/2004 Gromes, Sr. ................ 239/596
6,814,316 B1 * 11/2004 Gromes, Sr. ................ 239/596

* cited by examiner

*Primary Examiner*—David A. Scherbel
*Assistant Examiner*—Thach H. Bui
(74) *Attorney, Agent, or Firm*—Michael A. O'Neil

(57) ABSTRACT

A system for retaining and locating a jewel of the type comprising a nozzle for a water cutting system includes a first support structure component having a water discharge passageway extending therethrough and having an exterior locating surface formed at the water receiving end of the water directing passageway. A second support structure component has a water directing passageway formed therein and has a jewel receiving cavity formed therein at the discharge end of the water receiving passageway. The second support structure component further comprises a chamber for receiving and retaining the first support structure component with the locating surface thereof positioned in engagement with the locating surface of the jewel.

7 Claims, 2 Drawing Sheets

METHOD OF AND APPARATUS FOR MOUNTING WATER CUTTING NOZZLES

TECHNICAL FIELD

This invention relates generally to water cutting systems, and more particularly to improvements in the mounting of the jewels which comprise the nozzles of water cutting systems.

BACKGROUND AND SUMMARY OF THE INVENTION

As is well known to those skilled in the art, water cutting systems are utilized in a wide variety of industries to effect cutting of metals, plastics, and other materials. In the operation of a water cutting system, water at extremely high pressure, e.g., 50,000 psi, is directed through a nozzle which forms the water into a very small diameter, very high velocity stream. The nozzle typically comprises a jewel selected from the group consisting of diamonds, sapphires, and rubies. The jewel has a very small diameter orifice formed therethrough. For example, the diameter of the orifice formed through the jewel is typically between about 0.0004 inches and about 0.0016 inches.

Heretofore the jewels comprising the nozzles of water cutting systems have been mounted in nozzle support structures formed from stainless steel or other metals that are not subject to deterioration caused by exposure to water. A water discharge passageway extends through the support structure and a jewel receiving cavity is formed at the water receiving end of the water discharge passageway. The jewel comprising the nozzle of the water cutting system is mounted in the jewel receiving cavity and is retained either by a suitable adhesive or by positioning the jewel in a band of soft metal such as brass and then pressing the band of soft metal having the jewel retained therein into the jewel receiving cavity.

The jewel comprising the nozzle of the water cutting system has a locating surface comprising the inner end thereof. The jewel receiving cavity has a locating surface comprising the bottom thereof. Engagement between the locating surface of the jewel and the locating surface of the jewel receiving cavity is necessary to assure proper alignment of the orifice extending through the jewel.

As will be understood, the locating surfaces comprising the interior surface of the jewel and the bottom surface of the jewel receiving cavity must be entirely smooth, flat, and free of any radially extending grooves or ridges. Otherwise the water passing through the water discharge passageway of the support structure will enter the space between the bottom of the jewel receiving cavity and the interior surface of the jewel with the result being degradation of the locating surfaces and misalignment of the jewel within the jewel receiving cavity. However, because the locating surface of the jewel receiving cavity is located at the bottom thereof, consistency in providing the jewel engaging surface with the required surface finish has been difficult to achieve.

The present invention comprises a method of and apparatus for mounting the jewels which comprise the nozzles of water cutting systems which overcome the foregoing and other difficulties which have long since characterized the prior art. In accordance with the broader aspects of the invention a structure for receiving and positioning a jewel comprising the nozzle of a water cutting system includes two components. A first component has a water discharge passageway extending therethrough. The water discharge passageway extends from a jewel engaging exterior locating surface. Because it comprises an exterior surface of the first component, lapping the locating surface to achieve the required surface finish of less than 8 RMS is straightforward. Manufacturing techniques other than lapping which provide the necessary surface finish can also be used in the practice of the invention.

The second component of the jewel receiving and positioning structure comprises a chamber which receives the first component therein. The second component has a water directing passageway formed therein which extends to a jewel receiving cavity. A jewel comprising the nozzle of the water cutting system is received in the jewel receiving cavity of the second component with the locating surface thereof mounted in engagement with the exterior locating surface of the first component. Because the jewel is trapped between the first and second components of the support structure, the use of either an adhesive or a metal band to retain the jewel in the jewel receiving cavity is eliminated. Precise machining of the interior surfaces of the jewel receiving cavity is unnecessary since the positioning of the jewel is not dependent on the interior surfaces of the cavity but instead depends upon the engagement of the locating surface of the jewel with the exterior locating surface of the first component of the support structure.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
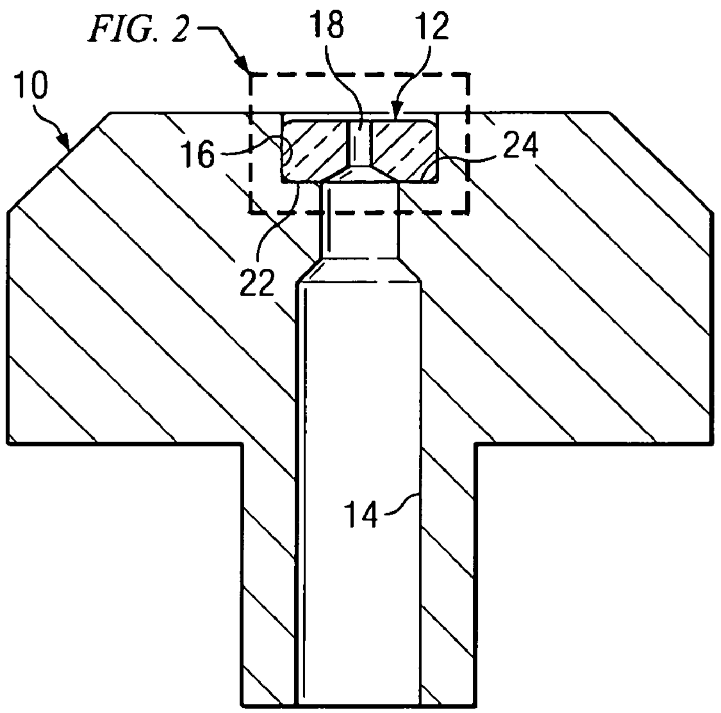
FIG. 1 (PRIOR ART)
FIG. 1 is a sectional view illustrating a prior art system for mounting jewels comprising the nozzles of water cutting systems.

Referring now to the Drawings, and particularly to FIG. 1 thereof, there is shown a support structure 10 of the type heretofore utilized to receive and position a jewel 12 which comprises the nozzle of a water cutting system. The support structure 10 is typically formed from stainless steel, however, other materials that are not subject to degradation due to exposure to water can also be utilized in the manufacture of the support structure 10. A water discharge passageway 14 extends through the support structure 10. A jewel receiving cavity 16 is formed in the support structure 10 at the water receiving end of the water discharge passageway 14.

The jewel 12 has an orifice 18 extending therethrough which typically has a diameter of between about 0.0004 inches and about 0.0016 inches. The jewel 12 typically has a width of about 0.072 inches and a thickness of about 0.035 inches. Water at extremely high pressure, e.g., 50,000 psi, is directed through the orifice 18 extending through the jewel 12. The function of the jewel 12 is to form the water into a very small diameter, very fast moving water stream.

The proper functioning of the jewel 12 depends upon accurate positioning thereof relative to the support structure 10. To this end the jewel 12 is provided with a locating surface 22 which comprises the interior surface of the jewel 12. The support structure 10 is provided with a cooperating locating surface 24 which comprises the bottom surface of the cavity 16.

Although the jewel 12 is characterized by very small dimensions, providing the necessary surface finish on the locating surface 22 thereof is relatively straightforward. This is because the surface 22 comprises an exterior surface of the jewel 12. Conversely, providing the necessary surface finish on the locating surface 24 of the support structure 10 has proven to be problematic. This is because the locating surface 24 is situated at the bottom of the cavity 16.

Irregularities in the surface finish of the locating surface 24 of the support structure 10 inevitably leads to failure of the nozzle of the water cutting system in which the jewel 12 is employed. This is because irregularities in the surface finish of the locating surface 24 of the support structure 24, and in particular radially extending grooves or ridges formed in the surface 24, allows water to enter the space between the locating surface 24 of the support structure 10 and the locating surface 22 of the jewel 12. The presence of water in the space between the locating surface 24 and the locating surface 22 causes degradation of the locating surfaces resulting in misalignment of the jewel 12.

Figure 3:
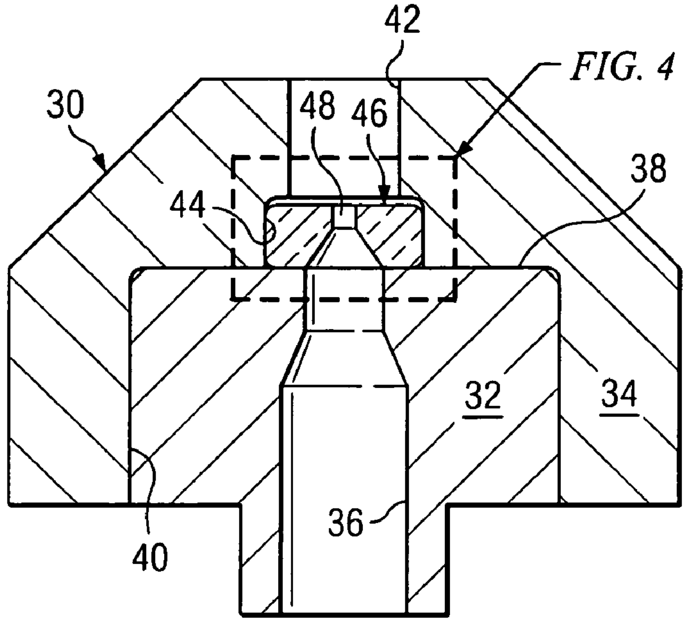
FIG. 3 is a sectional view illustrating an improved system for mounting jewels comprising the nozzles of water cutting systems constructed in accordance with the present invention.
Figure 4:
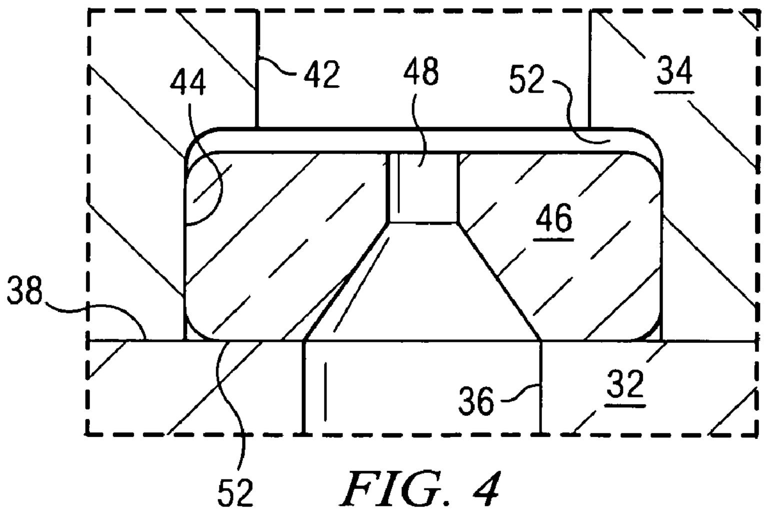
FIG. 4 is an enlargement of a portion of FIG. 3.

Referring to FIGS. 3 and 4, there is shown a method of and apparatus for positioning jewels comprising the nozzles of the water cutting systems which incorporates the present invention. A support structure 30 includes a first or interior component 32 and a second or exterior component 34. The first component 32 has a water discharge passageway 36 extending therethrough. The first component 32 further comprises a locating surface 38. As will be appreciated by those skilled in the art, the locating surface 38 of the first component 32 is an exterior surface. Because the locating surface 38 is formed on the exterior of the first component 32, the lapping thereof to achieve the required surface finish of less than 8 RMS is relatively straightforward. Other manufacturing techniques adapted to provide a very smooth surface finish may also be used in the practice of the invention.

The second component 34 of the support structure 30 has a chamber 40 which receives the first component 32. A water directing passageway 42 extends through the second component 34 and is axially aligned with the water discharge passageway 36 of the first component 32. A jewel receiving cavity 44 is formed in the second component 34 and receives a jewel 46 therein. The jewel 46 has an orifice 48 extending therethrough which defines the discharge nozzle of the water cutting system comprises the support structure 30 and the jewel 46.

Figure 2:
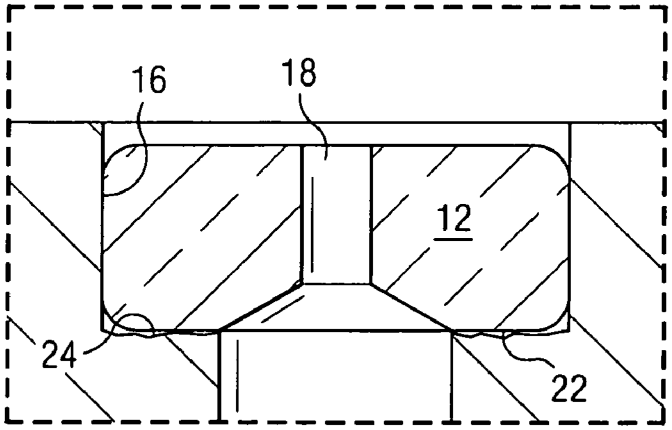
FIG. 2 (PRIOR ART)
FIG. 2 is an enlargement of a portion of FIG. 1.

The jewel 46 is substantially identical to the jewel 12 illustrated in FIGS. 1 and 2 and described hereinabove in conjunction therewith. The orifice 48 extending through the jewel 46 typically has a diameter of between about 0.0004 inches and about 0.0016 inches, it being understood that the diameter of the orifice 48 is dependent upon the requirements of particular applications of the invention. The jewel 46 typically has a width of about 0.072 inches and a thickness of about 0.035 inches, however, it will be further understood that the dimensions of the jewel 46 are dependent upon the requirements of particular applications of the invention. The jewel 46 is typically formed from a material selected from the group consisting of diamonds, sapphires, and rubies.

Referring particularly to FIG. 4, the jewel 46 has a locating surface 50 which engages the locating surface 38 of the first component 32 to effect proper positioning and alignment of the jewel 46. Because of the extremely smooth surface finishes of the locating surface 38 and the locating surface 50 water cannot penetrate the junction therebetween. By this means degradation of the locating surfaces is avoided and continued proper alignment of the jewel 46 is assured. Additionally, the jewel receiving cavity 44 is dimensioned to provide a gap 52 between the surface of the jewel 46 opposite the locating surface 50 and the adjacent surface of the second component 34. High pressure water within the water directing passageway 42 enters the gap 52 thereby further assuring a very tight engagement between the locating surface 38 of the first component 32 and the locating surface 50 of the jewel 46.

The embodiment of the invention shown in FIGS. 3 and 4 begins with the positioning of the jewel 46 in the jewel receiving cavity 44 with the locating surface 50 thereof facing outwardly from the water directing passageway 42. Thereafter the first component 32 of the support structure 30 is inserted into the chamber 40 of the second component 34 until the locating surface 38 of the first component engages the locating surface 50 of the jewel 46. Thereafter the first component 32 of the support structure 30 is clamped in engagement with the second component 34 thereof.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A method of locating a jewel comprising the nozzle of a water cutting system;

- providing a jewel having a water discharge orifice extending therethrough and having a locating surface;
- providing a first support structure component having a water discharge passageway extending therethrough and having an exterior locating surface at the water receiving end of the water discharge passageway;
- providing a second support structure component having a water directing passageway formed therethrough and having a jewel receiving cavity formed therein at the water discharge end of the directing passageway;
- positioning the jewel in the jewel receiving cavity of the second support structure component;
- positioning the locating surface of the first support structure component in engagement with the locating surface of the jewel; and
- thereafter directing a flow of water through the water directing passageway of the second support structure component, through the orifice of the jewel, and through the water discharge passageway of the first support structure component.

2. The method according to claim 1 wherein the step of providing a second support structure component includes the step of providing the second support structure component with a chamber and including the initial step of positioning the first support structure component in the chamber of the second support structure component.

3. The method according to claim 1 wherein the orifice extending through the jewel has a diameter of between about 0.0004 inches and about 0.0016 inches.

4. The method according to claim 1 wherein the jewel has a width of about 0.072 inches and a thickness of about 0.035 inches.

5. An apparatus for locating and retaining a jewel of the type comprising a nozzle for a water cutting system comprising:

a jewel having a water discharge orifice extending therethrough and having a locating surface at the water receiving end of the orifice;

a first support structure component having a water discharge passageway extending therethrough and having a locating surface located at the water receiving end of the water directing passageway;

a second support structure component having a water directing passageway formed therethrough, having a jewel receiving cavity formed therein at the water discharge end of the water directing passageway, and having a chamber formed therein for receiving the first support structure component;

the chamber for retaining the first support structure component with the locating surface thereof in engagement with the locating surface of the jewel.

6. The apparatus according to claim 5 wherein the jewel is formed from a material selected from the group consisting of diamonds, sapphires, and rubies.

7. The apparatus according to claim 5 wherein the orifice of the jewel has a diameter of between about 0.0004 inches and about 0.0016 inches.

* * * * *